United States Patent [19]

Alpaugh et al.

[11] 4,289,594
[45] Sep. 15, 1981

[54] TREATMENT OF WASTE COMPOSITIONS

[75] Inventors: Warren A. Alpaugh, Chenango Forks; George J. Macur, Endwell; James E. Sharkness, Ithaca, all of N.Y.

[73] Assignee: International Business Machines Corporation, Armonk, N.Y.

[21] Appl. No.: 148,345

[22] Filed: May 9, 1980

[51] Int. Cl.³ ............................................. B01J 19/12
[52] U.S. Cl. ......................... 204/158 R; 204/157.1 R
[58] Field of Search .......... 204/158 R, 158 P, 157.1 P

[56] References Cited

U.S. PATENT DOCUMENTS 3,844,914 10/1974 Murchison ...................... 204/158 P
4,144,152 3/1979 Kitchens ......................... 204/158 P Primary Examiner—Howard S. Williams
Attorney, Agent, or Firm—Pollock, Vande Sande & Priddy

[57] ABSTRACT

Process for treating liquid waste compositions which contain copper ions and a complexing agent for the copper which includes reducing the concentration of copper ions in the waste solution to less than about 8 ppm and contacting the solution with an ozone-containing gas and irradiating with ultraviolet light.

17 Claims, 1 Drawing Figure

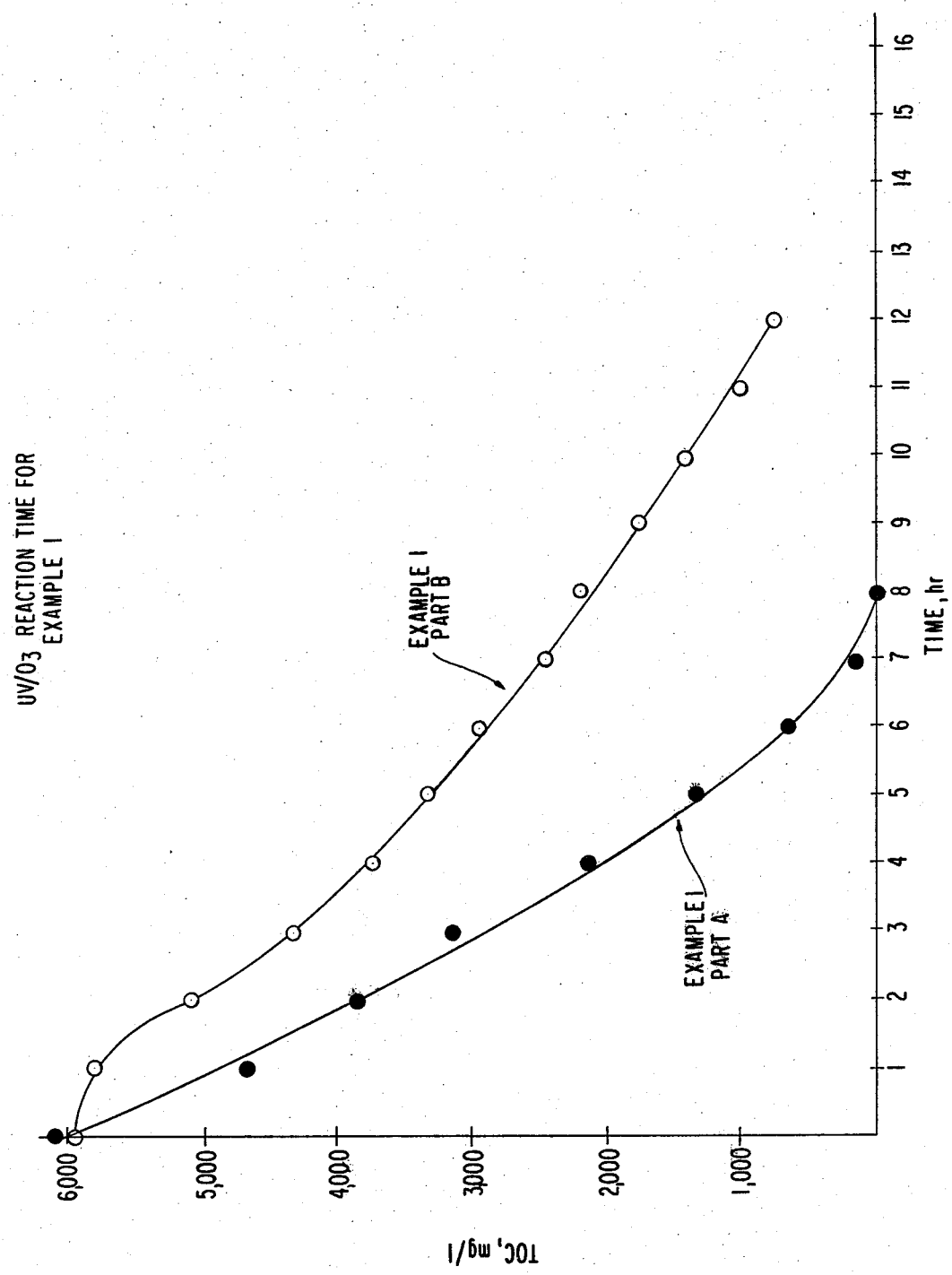

TREATMENT OF WASTE COMPOSITIONS

DESCRIPTION

Technical Field

The present invention is concerned with the treatment of liquid waste compositions which contain copper ions and a complexing agent for the copper in order to destroy the complexing agent. In particular, the present invention is related to a process for treating waste compositions by use of ozone and ultraviolet radiation. The process of the present invention is particularly advantageous when treating liquid waste compositions or overflow from electroless copper plating baths.

Background Art

One source of liquid waste compositions which contain copper ions and an organic material which complexes copper is the chemical waste stream or overflow from electroless copper plating baths referred to as copper additive plating. Electroless copper plating baths generally contain cupric ions, a reducing agent, a surfactant, and a complexing agent for cupric ions. In addition, the bath may contain numerous other chemicals, such as, for instance, cyanide ions as disclosed in U.S. Pat. No. 3,844,799 to Underkofler et al. With respect to electroless copper plating processes attention is also directed to U.S. Pat. No. 4,152,467 to Alpaugh et al.

Waste chemical streams from such processes are currently processed to remove copper and recover and recycle the complexing agent for the copper in a sequence of steps commonly referred to as "primary recovery". One such "primary recovery" technique includes removing copper from a plating bath overflow composition by plating out copper (i.e. deplating) from solution onto copper cathodes. However, some copper metal particles also fall to the bottom of the tank because the process does not yield highly adherent copper deposits on the cathode. Such a copper removal process yields a liquid composition with a copper concentration of at least 10-20 ppm as a practical operating lower limit. In addition, in such a process, the iron concentration in solution is increased in view of the reactions occurring at the stainless steel anodes and because of high concentration of complexing agent in the solution. Besides the copper, the effluent resulting from such a treatment contains complexing agent for the copper and relatively large amounts of dissolved organic and inorganic salts.

After the copper is removed, the solution is then transferred to another tank where the complexing agent is precipitated by the addition of sulfuric acid to provide a pH of about 2.5 and below. After the complexing agent settles to the bottom of the tank, the solution which is decanted is termed "additive waste".

The complexing agent remaining at the bottom of the tank is washed twice with deionized water and is then recycled to the plating bath. These two wash solutions or decants contain mainly sodium sulfate and formic acid along with dissolved and suspending complexing agent. These wash solutions can be combined with the additive waste solution or held for separate treatment or usage. However, in all cases, significant amounts of suspended complexing agent are transferred into the waste solutions and the particulate complexing agent must be removed by filtration prior to further treatment. As a result, the material is currently unacceptable for direct discharge to existing plant waste treatment systems. Accordingly, as a result, the material is pumped to a storage tank and later trucked away for controlled landfill or other disposal methods at a substantial cost per year.

Moreover, even if the additive waste solution contained only sodium sulfate and a few hundred ppm of the complexing agent, it would not be put through the plant waste treatment because the complexing agent would tend to dissolve heavy metals by complexing from the clarifier and piping system and thereby carry these into surrounding natural water sources, such as rivers, where the composition is finally discharged. Although copper would make up the bulk of the complex metal, small amounts of other heavy metals are quite possible.

Disclosure of Invention

The process of the present invention is directed to treating waste compositions which contain copper ions and a complexing agent for the copper ions. An objective of the process of the present invention is to reduce the level of the complexing agent low enough so that the waste composition can be treated subsequently in the usual plant waste treatment systems, including clarifiers without causing dissolution of heavy metals by complexing from the clarifier and the piping system.

The process includes contacting the waste solution with an ozone-containing gas in an amount effective to react with and destroy the complexing agent for the copper and irradiating the waste solution with ultraviolet light. Prior to irradiating the solution with ultraviolet light, the concentration of the copper ions in the waste solution is reduced to less than about 8 ppm.

BRIEF DESCRIPTION OF DRAWING

The FIGURE is a graph comparing results from the present invention to those outside of the scope of the present invention.

DESCRIPTION OF BEST AND VARIOUS MODES FOR CARRYING OUT INVENTION

The waste solutions treated according to the present invention initially contain significant quantities of copper ion and complexing agent for the copper. The compositions are aqueous compositions and most advantageously are those obtained as effluent or overflow from copper plating and especially from electroless copper plating.

The preferred copper plating compositions are those described in U.S. Pat. Nos. 3,844,799 and 4,152,467, disclosure of which are incorporated herein by reference. In particular, such electroless copper plating baths preferably contain about 30 to about 50 grams per liter of complexing agent; about 3 to about 15 grams per liter of a cupric salt, such as cupric sulfate; about 0.7 to about 7 grams per liter of a reducing agent, such as formaldehyde; about 0.02 to about 0.3 grams per liter of a surface-active agent, such as Gafac RE 610; about 10 to about 25 milligrams per liter of a cyanide, such as sodium cyanide; and a basic compound, such as sodium hydroxide or potassium hydroxide to provide a pH of about 11.6 to about 11.8.

Examples of complexing agents include Rochelle salts; ethylenedinitrilotetraacetic acid; metal salt of ethylenedinitrilotetraacetic acid such as the alkali metal salts including the sodium (mono-, di-, tri-, and tetrasodium) salts of ethylene diaminetetraacetic acid; nitrilotriacetic acid and its metal salts, such as the alkali salts; gluconic acid; gluconates; triethanol amine; glucono-(gamma)-lactone; modified ethylene diamine acetates, such as N-hydroxyethyl ethylene diamine triacetate.

The preferred complexing agents are ethylene dinitrilotetraacetic acid, nitrilotriacetic acid or 2-hydroxyethylene diamine triacetate or metal salts thereof. The metal salts include the alkali metal salts and especially the sodium salts, such as mono-, di-, tri- and tetrasodium salts of ethylene dinitrilotetraacetic acid. Mixtures of complexing agents can be present.

The most preferred complexing agents employed are ethylene dinitrilotetraacetic acid (i.e. EDTA) and the alkali metal salts thereof.

Typical waste solutions treated according to the present invention contain at least about 20 grams/liter of complexing agent and at least about 1 gram per liter of copper ions. Typical waste solutions treated according to the present invention contain the following:

| cupric ion source | |
|---|---|
| (e.g cupric sulfate pentahydrate) | 3–15 g/l |
| reducing agent (e.g. formaldehyde) | .7–7 g/l |
| surfactant (GAFAC RE610) | 0.02–0.3 g/l |
| complexing agent (e.g. - "EDTA", i.e. - ethylene dinitrilotetraacetic acid) | 20–50 g/l |
| pH | 11.6–11.8 |
| specific gravity | 1.060–1.080 |

In addition, the composition can include other components such as cyanide ions from, for example, sodium cyanide, such as in amounts of about 10–25 mg/l. Moreover, the waste compositions contain relatively large amounts of iron as ferric complex with the complexing agent; about 100–105 g/l of sodium sulfate; about 25–30 g/l of the oxidized form of the reducing agent (e.g.-formic acid).

It is essential to the practice of the present invention that the copper ion concentration of the waste solution be reduced to less than 8 ppm, preferably less than 5 ppm, and most preferably less than 1 ppm in order to achieve the desired ozone-ultraviolet light treatment of the solutions to destroy the organic complexing agents therein at increased speed.

It is critical to the success of the present invention to reduce the concentration of copper ions in the waste solution to less than about 8 ppm prior to the irradiation with ultraviolet light. A preferred method of reducing the copper ion content is to add pure copper dust to a batch of the additive bath overflow waste solution and a reducing agent, such as about 7–15 ml/l of a 37% aqueous formaldehyde and adjusting the pH to about 12 by an addition of a basic material, such as sodium hydroxide or potassium hydroxide. This treatment results in reducing copper ions in the composition to levels below 1 ppm. It is most convenient to employ a 37% aqueous formaldehyde solution and a 50% sodium hydroxide solution for this purpose. The treatment can be carried out at about 70° to 80° C. The reaction which occurs is set forth below:

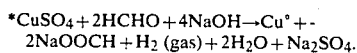
*CuSO$_4$+2HCHO+4NaOH→Cu°+·
2NaOOCH+H$_2$ (gas)+2H$_2$O+Na$_2$SO$_4$.

*Cu(II) is present in the solution as EDTA complex.

In addition, the above process also results in conversion of any residual inorganic cyanide in the aqueous composition to the innocuous cyanohydrin form.

This treatment is capable of reducing the copper ion concentration to levels below 1 ppm whereas the deplating technique described hereinabove results in compositions containing dissolved iron ions as well as at least 10 to 20 ppm of copper ions. Although the amount of copper ions from such a process is quite small, subsequent treatment with ozone and ultraviolet light is much too slow. Furthermore, the iron ion concentration in such compositions usually range from about 5 to about 20 ppm. Lower copper concentrations by deplating processes can be achieved, but this usually results in higher iron concentrations. Copper concentrations around 50 ppm also frequently occur for a number of practical reasons. Accordingly, the deplating technique described hereinabove results in significant amounts of both iron and copper. The iron comes into solution by corrosion of stainless steel anodes which are present. Even though the plating solution is strongly basic (pH about 11.6–11.9), iron goes into solution as a ferric complex with the complexing agent because of the relatively high amount of complexing agent present in the composition.

It is also preferred according to the present invention to reduce the iron ion concentration to less than 5 ppm, and preferably less than 1 ppm, prior to the treatment with ultraviolet light.

After the copper ion concentration is decreased to the desired level, the composition is preferably, but not necessarily, transferred to a precipitation tank where the complexing agent, such as the major amount of ethylene dinitrilotetraacetic acid, is precipitated by the addition of an acid, such as sulfuric acid as is currently practiced.

The acid is added in amounts sufficient to provide the composition with a pH of about 2.5 or below for best results.

The somewhat enlarged copper particles can remain on the bottom of the tank as seed for the next batch of plating solution to be processed, or can be washed with the deionized water prior to etching.

The composition after the removal of the complexing agent still contains significant amounts of the complexing agent. In the case of EDTA, at least about 500 mg/liter are present and usually at least about 1000 mg/l. The composition also contains generally from about 6000 to about 7000 mg/l of organic carbon compounds which is mostly reducing agent and/or oxidized compound therefrom, and at least 100 grams per liter of inorganic salts, such as sodium sulfate.

The aqueous waste composition is then subjected to an ozone-containing gas and irradiation with ultraviolet light. This treatment causes destruction and decomposition of the organic compounds present in the waste composition. Using formic acid as a typical example of the oxidized form of the reducing agent, the primary reaction involved is as follows:

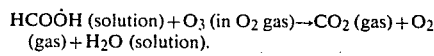
HCOOH (solution)+O$_3$ (in O$_2$ gas)→CO$_2$ (gas)+O$_2$ (gas)+H$_2$O (solution).

This stage of the process is preferably carried out at a pH of 4 to 6. It has been found that pH in the above range provides for increased rate of oxidation of the formic acid present. In addition, it is preferred that the iron ion concentration be less than 5 ppm, and preferably less than about 1 ppm during this stage of the reaction, since such level helps to further enhance the destruction of the complexing agent. Moreover, as discussed herinabove, it is critical to the practice of the present invention that the concentration of the copper ions in solution be less than 8 ppm. It is believed that by reducing the concentration of copper ions in solution, the formation of fine particles of black CuO is significantly reduced.

The primary reaction products from this stage of the process are $CO_2$ and $H_2O$. In addition, the process is capable of providing a product which contains less than about 10 mg/liter, and preferably less than about 5 mg/l of the complexing agent. This is to ensure that the waste composition can be discharged through the usual plant clarifier system without causing problems with respect to complexing of heavy metals within the clarifying system and piping arrangement.

The amount of ozone employed is dependent upon the amount of organic materials in the composition which are to be decomposed. Generally at least 8 grams of ozone are employed per gram of organic carbon atom present. The mass flow rate of the ozone through the composition is generally up to about 800 milligrams per minute per g/l of solution. The ozone-containing gas is bubbled through the aqueous composition in order to maximize the contact area between the ozone and the organic material. The ozone-containing gas is preferably a mixture of ozone and oxygen and preferably contains about 3 to about 3.5% by weight of ozone. The temperature during the treatment is generally about 25° C. (normal room temperatures) to about 50° C.

Any conventionally employed ozone-generating device can be employed in accordance with the present invention. One typical ozone-generating device generates a gas which comprises about 1 to about 8% by weight ozone, from about 20 to about 99% by weight oxygen, and up to about 80% by weight nitrogen with possibly small quantities of other gases which are normally present in air, such as carbon dioxide, argon, and the like. The term "ozone-containing gas" is meant to embrace any and all gases which are generated by an ozone generator, and the amount of ozone and other components of the ozone-containing gas can be varied within wide limits while still obtaining the advantages of the process of the present invention. A typical ozone-generator is an Orec Model 03 B2-0 Ozonator made by Ozone Research and Equipment Corporation, Phoenix, Ariz.

It is preferred, in view of the presence of surface-active agents in the aqueous composition, to initially bubble the ozone-containing gas through the composition at a very low feed rate, such as less than about 0.1 standard cubic feet per minute per 9 liters of waste solution in order to minimize the formation of foam in the composition. Normally, the low flow rate is maintained until foaming due to the presence of the surface-active agent subsides to a point low enough to allow oxygen flow to increase to about 0.5 standard cubic feet per minute per 9 liters of waste solution without foaming over the top of the treatment vessel. The foam destruction usually takes about 30 minutes. During this period of time, the surface-active agent, which is generally concentrated in the film of liquid surrounding the gas bubbles, is destroyed by the ozone.

The source of ultraviolet light employed according to the present invention can take any conventional form and is generally a conventional source which emits radiation within the ultraviolet region of the spectrum. Any typical source of ultraviolet light can be utilized in accordance with the process of the present invention. A typical ultraviolet light source is Volt Arc G36 T66 Ultraviolet Lamp rated at 36 watts.

It is believed that at the beginning of the treatment with the ultraviolet radiation and ozone, that the reducing agent and/or oxidized form therefrom, such as formic acid, constitutes more than about 90% by weight of the organic components in the aqueous composition, and the oxidation of such consumes most of the ozone fed into the composition by the following reaction:

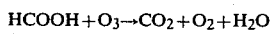

$$HCOOH + O_3 \rightarrow CO_2 + O_2 + H_2O$$

As a result, only a small portion of the initial ozone feed is available for oxidizing the complexing agent, such as the ethylene dinitrilotetaacetic acid, as well as the other organic components of the waste composition. Of course, as the treatment proceeds, a greater portion of the ozone become available for oxidation of the complexing agent. However, the overall process for oxidizing the complexing agent in the presence of, for instance, formic acid and the various other organic constituents in the composition is relatively slow. For instance, for a composition with the same initial concentration of complexing agent, such as the etylene dinitrilotetraacetic acid, but not containing other organic compounds, the oxidation treatment would require only two or three hours.

However, in the presence of the other organic compounds and in the presence of, for instance at least about 10 ppm of cupric ions, destruction of the complexing agent requires at least about 18 hours. This long treatment time is quite costly and renders such a process economically unattractive from a commercial viewpoint. On the other hand, by reducing the cupric ion concentration to less than 1 ppm, as most preferred, the amount of time needed to reduce the amount of complexing agent to less than 5 mg/liters is less than half of the time required when greater amounts of cupric ion are present. In particular, the amount of time needed is from about 8 to about 10 hours.

The following nonlimiting example is presented to further illustrate the present invention:

EXAMPLE I

Part A

About 9 liters of a liquid waste composition from an electroless copper plating bath are introduced into a stainless steel reaction chamber. The composition is as follows:

| | |
|---|---|
| sodium sulfate | 100–105 g/l (grams per liter) |
| EDTA (complexer) | 1000 ppm |
| Cu + + (EDTA complex) | <1 ppm |
| Fe + + + (EDTA complex) | <1 ppm |
| pH | 4–6 |
| total organic carbon | 6500 ± 500 mg/l |
| GAFAC RE610 (anionic surfactant) | 50–100 mg/l |

More than 90% of the organic carbon comes from the formic acid. GAFAC RE 610 is phosphated polyoxyethylenated alkyl phenols and metal salts thereof.

The waste composition had previously been treated to reduce the copper ion concentration therein by adding about 15 g/12 l batch of pure copper dust, about 90 ml of 37% aqueous formaldehyde and sodium hydroxide to provide a pH of about 12 and heating to about 70° C. In addition, the composition had been treated to precipitate EDTA by adjusting the pH to about 2–3 with $H_2SO_4$.

The pH of the composition is adjusted to 4–6.

The tests are run with an Ultrox. Irrad. Model B-803 bench scale UV-Ozone system. The reaction vessel is equipped with 3 volt arc (G36 T66) ultraviolet lamps rated at 36 watts each. The lamps which are about 3' long are placed inside the vessel in the solution. The lamps are within quartz holders for protection.

Oxygen is bubbled into the reaction vessel from the bottom through 6 porous ceramic diffusers or spargers. The oxygen flow rate at this point is less than about 0.1 standard cubic feet per minute. Both the ultraviolet light lamps and ozone generator are then turned on. The ozone generator is an Orec Model 03 B2-0 Ozonator made by Ozone Research and Equipment Corporation of Phoenix, Ariz. Oxygen from a cryogenic storage container is fed to the ozonator. The ozone concentration of the oxygen is about 3 to about 3.5 weight percent. The flow rate of about 0.1 standard cubic feet per minute is maintained for about 30 minutes. This is in order to minimize foaming due to the surface-active agent present in the composition. The 30 minutes is usually enough in order to completely destroy the surface-active agent presnt. Then the gas flow rate is increased to about 0.48 to about 0.5 standard cubic feet per minute. The ozone mass flow rate during the treatment ranges from about 630 to about 690 milligrams per minute. When the ozone-oxygen gas flow rate is increased to about 0.5 standard cubic feet per minute, the ozone generator power is set to yield about 2 to about 2.2 pounds per day of ozone.

As the process proceeds, samples are taken hourly in order to determine total organic carbon (TOC) analyses and pH measurements. The pH was maintained in the range of 4 to 6. The initial pH was adjusted with 50% sulfuric acid in order to keep the solution in the desired acidity range. During the first few hours it was necessary to check the pH at 30-minute intervals and made the required additions of sulfuric acid.

The total organic carbon analyses were carried out with a Dohrman/Envirotech, Model DC-54 Ultralow Organic Carbon Analyzer. Purified deionized water was used to make required dilution of waste samples prior to analysis. The measurement and control of solution pH was carried out with the aid of a Corning Model 12 research type pH meter checked against appropriate buffers for the pH range in question.

The total organic carbon in the solution is reduced from about 6000 mg/liter to a negligible value in only about 8 hours.

Comparison Part B

Part A is repeated under the same conditions and with the same conditions and with the same composition except that it contains about 18 ppm of cupric ion and about 16 ppm of ferric ion. The cupric and ferric ion levels were obtained by an electrolytic type of recovery or deplating as referred to hereinabove.

After 12 hours, the waste solution still contained about 950 mg/liters of organic carbon and the estimated time for a complete treatment was about 18 to about 20 hours. Moreover, after 12 hours, the solution had an ethylene dinitrilotetraacetic acid content of about 430 ppm as compared to only 5 ppm after 8 hours of treatment for the process in part A. After 10 hours the composition became turbid and examination of the sample of the composition showed a red-brown precipitate of $Fe(OH)_3$ which settled after standing 24 hours. Although the total amount of iron is small, the effect on the reaction of a very large number of minute $Fe(OH)_3$ particles is very significant.

The test results obtained from Parts A and B are shown graphically in FIG. 1 herein. Although only 2 curves are shown, each test was run at least twice with nearly identical results. All test conditions were the same, except that the waste solutions from Part A contained less than 1 ppm of iron ion and less than 1 ppm of copper ion, whereas those from Part B contained 16 ppm of iron and 18 ppm of copper ion.

A comparison of Parts A and B and the results obtained thereby clearly demonstrates the essential and critical aspects of the present invention of reducing the copper ion and also the iron ion content.

What is claimed is:

1. A process for treating liquid waste composition containing copper ions and an organic complexing agent for the copper ions which comprises:
   reducing the concentration of copper ions in the waste composition to less than 8 ppm; then contacting the waste composition with an ozone-containing gas in an amount effective to react with and destroy said organic complexing agent; and irradiating said waste composition with ultraviolet light.

2. The process of claim 1 wherein the copper ion concentration is reduced to less than about 5 ppm prior to irradiating.

3. The process of claim 1 wherein the copper ion concentration is reduced to less than about 1 ppm prior to irradiating.

4. The process of claim 1 or 2 or 3 wherein the concentration of iron ions in said waste composition is reduced to less than 5 ppm prior to the irradiating.

5. The process of claim 1 or 2 or 3 wherein the concentration of iron ions in said waste composition is reduced to less than 1 ppm prior to the irradiating.

6. The process of claim 1 wherein the copper ion concentration is reduced by adding copper particles, and a reducing agent to plate copper on the copper particles.

7. The process of claim 6 wherein the pH is adjusted to about 12.

8. The process of claim 6 wherein the reducing agent is formaldehyde.

9. The process of claim 6 wherein the reduction of the copper in concentration is carried out at about 70°–80° C.

10. The process of claim 1 wherein the concentration of complexing agent is reduced prior to the irradiation.

11. The process of claim 10 wherein the concentration of complexing agent is reduced by adjusting the pH of the composition to about 2.5 or less to cause precipitation of the complexing agent.

12. The process of claim 1 wherein said complexing agent is selected from the group of ethylenedinitrilotetraacetic acid, nitrilotriacetic acid, hydroxyl derivations thereof, alkali metal salts thereof, or mixtures thereof.

13. The process of claim 1 wherein said complexing agent is ethylenedinitrilotetraacetic acid or alkali metal salt thereof, or mixtures thereof.

14. The process of claim 1 wherein at least 1 g/l of copper ion is initially present in said waste composition.

15. The process of claim 1 or 12 or 13 wherein at least about 500 mg/l of complexing agent is present prior to the irradiation.

16. The process of claim 1 wherein the product obtained contains less than about 10 mg/l of complexing agent.

17. The process of claim 1 wherein the product obtained contains less than about 5 mg/l of complexing agent.

* * * * *